(12) United States Patent
Li

(10) Patent No.: US 8,971,899 B2
(45) Date of Patent: Mar. 3, 2015

(54) METHOD FOR SIGNALING A PATH TO RADIO STATIONS OF A RADIO COMMUNICATIONS SYSTEM

(75) Inventor: Hui Li, Beijing (CN)

(73) Assignee: Nokia Solutions and Networks GmbH & Co. KG, Munich (DE)

( * ) Notice: Subject to any disclaimer, the term of this patent is extended or adjusted under 35 U.S.C. 154(b) by 2417 days.

(21) Appl. No.: 10/577,664

(22) PCT Filed: Oct. 21, 2004

(86) PCT No.: PCT/EP2004/052601
§ 371 (c)(1),
(2), (4) Date: May 1, 2006

(87) PCT Pub. No.: WO2005/043823
PCT Pub. Date: May 12, 2005

(65) Prior Publication Data
US 2007/0133452 A1    Jun. 14, 2007

(30) Foreign Application Priority Data
Oct. 31, 2003 (DE) ................................. 103 50 909

(51) Int. Cl.
*H04W 40/00* (2009.01)
*H04W 40/04* (2009.01)

(52) U.S. Cl.
CPC ..................................... *H04W 40/04* (2013.01)
USPC ....... 455/445; 455/418; 455/552.1; 455/11.1; 455/41.2; 455/432.1; 370/338; 370/221; 370/328; 370/218; 370/236

(58) Field of Classification Search
CPC ..... H04W 84/18; H04W 40/20; H04W 40/30; H04W 4/20; H04W 88/04; H04W 72/04; H04W 88/182; H04W 92/18; H04W 92/20; H04W 40/02; H04W 12/06; H04W 40/00; H04W 40/12; H04W 76/025; H04W 84/12; H04W 84/22; H04W 40/36; H04W 4/08; H04L 45/00; H04L 45/123; H04L 45/124; H04L 12/189; H04L 45/16; H04L 41/12; H04L 45/22; H04L 45/24
USPC ......... 370/328, 474, 338, 329, 401, 252, 337, 370/310, 231, 351, 469, 221, 218, 236; 455/11.1, 445, 456.1, 418, 552.1, 26.1, 455/417, 41.2, 432.1, 435.2
See application file for complete search history.

(56) References Cited

U.S. PATENT DOCUMENTS
6,549,543 B1 * 4/2003 Shin .............................. 370/474
(Continued)

FOREIGN PATENT DOCUMENTS
EP      1 398 910    3/2004
WO    01/11833      2/2001
WO    01/41377      6/2001

OTHER PUBLICATIONS
Yu Ching Hsu et al., Base-Centric Routing Protocol for Multihop Cellular Networks, IEEE 2002, pp. 158-162.
(Continued)

*Primary Examiner* — Fred Casca
(74) *Attorney, Agent, or Firm* — Squire Patton Boggs (US) LLP

(57) ABSTRACT

The invention relates to a method for determining a path between a first radio station and an access point of a radio communications system, whereby the radio communications system comprises additional radio stations. A frequency band subdivided into a number of subbands is used in order to communicate between, the radio stations. At least one subband for communicating is assigned to each radio station. The path extends over one or more of the additional radio stations so that information between the first radio station and the access point can be transmitted over the path. The path is at least partially determined by a radio installation apparatus on request of the first radio station. The radio installation additionally transmits, to at least a portion of the radio stations of the path, respective path identification information, subband information and radio station identification information.

13 Claims, 2 Drawing Sheets

(56) References Cited

U.S. PATENT DOCUMENTS

| | | | |
|---|---|---|---|
| 6,985,476 B1* | 1/2006 | Elliott et al. | 370/474 |
| 2002/0041593 A1* | 4/2002 | Leuca et al. | 370/389 |
| 2003/0022670 A1* | 1/2003 | Hassan et al. | 455/434 |
| 2003/0109217 A1* | 6/2003 | Reed et al. | 455/3.05 |
| 2003/0227889 A1* | 12/2003 | Wu et al. | 370/335 |
| 2004/0014491 A1* | 1/2004 | Weigand | 455/552.1 |
| 2004/0146013 A1* | 7/2004 | Song et al. | 370/279 |
| 2004/0192295 A1* | 9/2004 | Tsao et al. | 455/432.1 |

OTHER PUBLICATIONS

Hui Li et al., Comparison of Ad Hoc and Centralized Multihop Routing, IEEE 2002, pp. 791-795.

Hui Li et al., Multihop Communications in Future Mobile Radio Networks, Siemens AG, Information and Communication Mobile, 81730 Munich, Germany.

* cited by examiner

METHOD FOR SIGNALING A PATH TO RADIO STATIONS OF A RADIO COMMUNICATIONS SYSTEM

CROSS REFERENCE TO RELATED APPLICATIONS

This application is based on and hereby claims priority to PCT Application No. PCT/EP2004/052601 filed on Oct. 21, 2004 and German Application No. 10350909.7 filed on Oct. 31, 2003, the contents of which are hereby incorporated by reference.

BACKGROUND OF THE INVENTION

The invention relates to a method for determining a path between a first and a second radio station of a radio communications system. In addition, the invention relates to a radio installation for carrying out said method.

In radio communications systems, information (for example, voice, picture information, video information, SMS (Short Message Service), MMS (Multimedia Messaging Service) or other data is transmitted by using electromagnetic waves over a radio interface between the sending and the receiving radio station. In this case, the radio stations involved can be, depending on the specific development of the radio communications system, various kinds of radio stations, radio access points or base stations on the subscriber side. Therefore, the electromagnetic waves in this case are radiated using carrier frequencies which lie in the frequency band provided for the specific system.

Radio communications systems are often embodied as cellular systems, for example, according to the GSM (Global System for Mobile Communication) standard or the UMTS (Universal Mobile Telecommunications System) standard with a network infrastructure having, for example, base stations, installations for checking and controlling the base stations and additional installations on the network side. For the cellular GSM mobile radio system, frequencies at 900, 1800 and 1900 MHz are used.

In addition to these wide-area organized (supralocal) cellular, hierarchical radio networks, in this case wireless local networks (WLANs, Wireless Local Area Networks) with a usually spatially more clearly defined radio coverage area are also available. The cells covered by the WLAN access points (AP: Access Point) with a diameter of up to a few hundred meters are small compared to usual mobile radio cells. Examples of different standards for the WLANs are Hiper-LAN, DECT, IEEE 802.11, Bluetooth and WATM. However, in particular in the USA and in Europe, almost exclusively products based on the IEEE 802.11 family seem to be gaining recognition at present as the local radio-supported networks.

In many WLANs, radio stations can communicate directly with each other on the subscriber side over one or more hops (hop or multihop). In addition, they can send and receive data via the WLAN access points (AP: Access Point), which are usually connected to other communications networks. The connection of a radio station on the subscriber side to a radio access point can take place either directly or over hops by routing the data through other radio stations.

In general, WLANs use the unlicensed frequency range around 2.4 GHz, in which the data transmission rates are up to 11 Mbit/s. It is possible to operate future WLANs in the 5 GHz range and reach data rates exceeding 50 Mbit/s. In this way, data rates are made available to the subscribers of the WLANs, said data rates being considerably higher than those which will be offered by the third mobile radio generation (for example, UMTS).

Access by radio stations to joint radio resources of the transmission medium, such as for example time, frequency, power or space, is controlled in the case of radio communications systems by multiple access methods (Multiple Access, MA). In the case of orthogonal frequency multiple access methods commonly known as orthogonal frequency division multiplex methods (OFDM, Orthogonal Frequency Division Multiplex), a broad frequency band is subdivided into a plurality of a plurality of narrowband subbands. One subband, more subbands or all the subbands are assigned to the radio stations for purposes of communication.

In an adhoc mode of a radio communications system, radio stations on the subscriber side transmit data to each other without it being necessary to route this data through a central installation. In this case, the connection between two radio stations on the subscriber side takes place either directly or, in the case of greater distances, via additional radio stations on the subscriber side which form relay stations for this connection. The radio stations on the subscriber side of such a self-organized network can be mobile radio stations (for example, mobile radio equipment of persons or in passenger cars) on the subscriber side and/or predominantly stationary radio stations (for example, computers, printers, household appliances) on the subscriber side.

Before data can be transmitted between two radio stations on the subscriber side in an adhoc mode of a radio communications system, a path must first be determined between these two radio stations. Said path extends over a plurality of a plurality of radio stations which route the data. Also in the case of a radio station of a WLAN on the subscriber side, which is located outside the direct radio coverage area of the radio access point, a path must be determined between the radio station and the radio access points on the subscriber side before a communication between the radio station on the subscriber side and the radio access point can take place. The determination of a path through a radio communications system is called routing.

SUMMARY OF THE INVENTION

One possible object of the invention relates to demonstrating an efficient method for determining a path in a radio communications system, in which the radio stations make use of a multicarrier method for communicating. In addition, a radio installation for carrying out said method is to be demonstrated.

The inventor proposes a method for determining a path between a first and a second radio station of a radio communications system, with the radio communications system comprising, in addition to the first and the second radio station, one or more additional radio stations. A frequency band subdivided into a plurality of a plurality of subbands is used in order to communicate between the radio stations. At least one subband for communicating is assigned to each radio station. The path extends over one or more of the additional radio stations so that the information between the first and the second radio station can be transmitted over the path. The path is at least partially determined by a radio installation at the request of the first radio station. The radio installation transmits at least the path identification information to the first radio station. The radio installation additionally transmits, to at least a part of the radio stations of the path, the respective path identification information and the radio station identification information from at least one other radio station of the path and/or from the first and/or from the second radio station, and transmits the subband information about at least one subband assigned to the at least one radio station corresponding to the radio station identification information.

Within the framework described above, subbands for communication with each other have been assigned to the radio stations of the radio communications system. It is possible that there will be radio stations to which no subbands have currently been assigned, for example, radio stations or a radio station in a special mode, which has not currently been registered. However, these radio stations are not relevant to the method so that only those radio stations to which at least one subband for communicating has been assigned are taken into account here. With regard to the nature of assigning subbands to the radio stations it is possible for different subbands to be assigned to the differing radio stations in each case or also for subbands to be assigned to a plurality of radio stations jointly.

At the request of the first radio station to the radio installation, which can for example be implemented by a base station, to determine a path to a second radio station, the radio installation determines either all the radio stations of the path, i.e. all the radio stations which route the information between the first and the second radio station or also only some of these radio stations. The determination of the radio stations of the path in the radio installation can also be implemented by the radio installation routing the request to an installation connected to the radio installation, which determines the radio stations and returns the result to the radio installation. After the radio stations have been determined, the radio installation transmits all the information of the path to all the radio stations of the path determined by it or to some of the radio station of the path determined by it, which comprises the path identification information and the radio station identification information and the subband information.

The request of the first radio station can be sent directly or via other radio stations to the radio installation. The path to be determined can for example be either a path between a radio station and a radio access point of a WLAN on the subscriber side or a path between two radio stations on the subscriber side in an adhoc mode of the radio communications system.

In a further development, the radio installation additionally transmits to the first radio station radio station identification information of the radio station of the path adjacent to it in the path direction from the first to the second radio station and transmits the subband information about at least one subband assigned to this neighboring radio station. In this way, the information is sent to the first radio station about its only neighboring radio station of the path, and indeed the radio station identification information and the subband information of this only neighboring station of the path. In addition, the radio installation transmits to each radio station of the path the path identification information as well as the radio station identification information of the radio station of the path adjacent to it in the path direction from the first to the second radio station or in the case of the last radio station of the path of the second radio station in the path direction from the first to the second radio station and transmits the subband information about at least one subband assigned to this neighboring radio station. In this way, both the path identification information and the identification information of the neighboring radio station of the path on the side of the second radio station are sent to each radio station of the path. Because the radio station of the path neighboring the second radio station do not have a neighboring radio station of the path on the side of the second radio station, the radio identification information of the second radio station is sent to this station. In this way, all the radio stations of the path are conversant with the identification information of that radio station, to which these stations should route the data, which should be sent from the first to the second radio station. In addition, the subband information of this radio station to which data has to be routed from the first to the second radio station, is transmitted to each radio station of the path.

Advantageously, the radio installation transmits to each radio station of the path, the additional radio station identification information of the radio station of the path adjacent to it in the path direction from the second to the first radio station or in the case of the last radio station of the path of the first radio station in the path direction from the second to the first radio station and transmits the subband information about at least one subband assigned to this neighboring radio station. Because of this, the information is transmitted about the neighboring radio stations on the side of the first radio station. Because the radio station of the path neighboring to the first radio station does not have a neighboring radio station of the path on the side of the first radio station, the radio station identification information of the first radio station is transmitted to this radio station. In this way, to all the radio stations of the path, the radio station identification information and the subband information is transmitted of that radio station, to which data has to be routed which is transmitted from the second to the first radio station over the path.

It is possible that the radio installation of the second radio station transmits at least path identification information. In an embodiment, the radio installation of the second radio station transmits the additional radio station identification information of the radio station of the path adjacent to it in the path direction from the second to the first radio station and transmits the subband information about at least one subband assigned to this neighboring radio station of the path. In this way, the information is sent to the second radio station about its only neighboring radio station of the path, whereby this information is relevant for the transmission of data from the second radio station to the first radio station over the path.

In a further development, the radio stations of the radio communications system are combined into groups and the radio stations of the part of the radio stations of the path which transmits the path identification information, the radio station identification information and the subband information to the radio installation in each case belong to a different group. Advantageously, different subbands for communicating have been assigned separately to each group. The radio installation does not transmit the path identification information, the radio station identification information and the subband information to a plurality of radio stations of one group. In this case, it is possible that the radio installation only determines a part of the path to be established while selecting a plurality of groups over which the path should extend and, in each case, transmits the respective path identification information, the radio station identification information and the subband information to a radio station of the selected group.

It is advantageous if the radio station identification information and the subband information transmitted to the radio station or the radio stations of the part of the radio stations, to the next radio station of the part of the radio stations in the path direction from the first to the second radio station, or in the case of the last radio station of the part of the radio station in the path direction from the first to the second radio station refer to the second radio station. In this way, the radio installation of the radio stations or said station selected by you, in each case, transmits the information about the neighboring radio station selected on the side of the second radio station. Because the selected radio station, which is the last selected radio station in the direction of the second radio station does not have such a neighboring radio station of the path, the radio station identification information and the subband information of the second radio station is transmitted to this station. In this way, the selected radio station or the selected radio stations are conversant with the information which they need in order to route the data, which should be sent from the first to the second radio station about the path to the next group in the direction of the second radio station.

In addition, the radio station identification information and the subband information transmitted to the radio station or the radio stations of the part of the radio stations, to the next radio station of the part of the radio stations in the path direction from the second to the first radio station, or in the case of the last radio station of the part of the radio stations in the path direction from the second to the first radio station can refer to the first radio station. In this case, the information is transmitted in this manner to the radio stations or the selected radio stations, said information being relevant for a data transmission from the second to the first radio station.

In an embodiment, at least one radio station forwards the part of the radio stations of the path identification information transmitted to the radio installation and/or the radio station identification information and/or the subband information to at least one radio station of its group, to which no path identification information, radio station identification information and subband information were transmitted by the radio installation. In this way, that radio station of a group to which the information with regard to the path was sent by the radio installation, can select another radio station of its group, which is to route data to the neighboring group of the path. For this purpose, it transmits to this radio station the information about the path transmitted to it by the radio installation, i.e. the path identification information, the radio station identification information of the selected radio station of the neighboring group and the associated subband information.

It is advantageous if the radio installation of the first radio station and/or the second radio station and/or at least one radio station of the path assigns at least has one subband for transmission of the path identification information. This assigning of at least one subband can relate to assigning of one subband for the first time or also of a change in one previously assigned subband. Thus, with the transmission of the information about the path determined by the radio installation, radio resources for a transmission of data from the first to the second radio station can be assigned to a suitable extent to the radio stations of the path. In this case the at least one subband can be assigned in the same message as the path identification information or also in a separate message, which is sent before or after the path identification information.

The proposed radio installation has a memory to store neighboring relationships between radio stations of a radio communications system. The radio installation can thus store the current topology of the network. For this purpose, the individual radio stations advantageously transmit information about the neighboring radio stations determined by them to the radio installation. In addition, the radio installation has a mechanism to assign the subbands of a frequency band used for communication between the radio stations to at least one part of the radio stations, as well as a memory to store information about the subbands assigned to the radio stations. In addition, the radio installation may have a mechanism to determine at least the parts of a path between a first and a second radio station on request, whereby the path extends over one or more of the additional radio stations so that information between the first and the second radio station can be transmitted over the path. Finally, the radio installation has a transmitter to transmit information to at least one radio station of the path, whereby this information transmits the path identification information of the specific path, the radio station identification information from at least another radio station of the path or the second radio station and also transmits subband information about at least one subband assigned to the at least one radio station corresponding to the radio station identification information.

The radio installation is particularly suitable for carrying out the inventive method.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
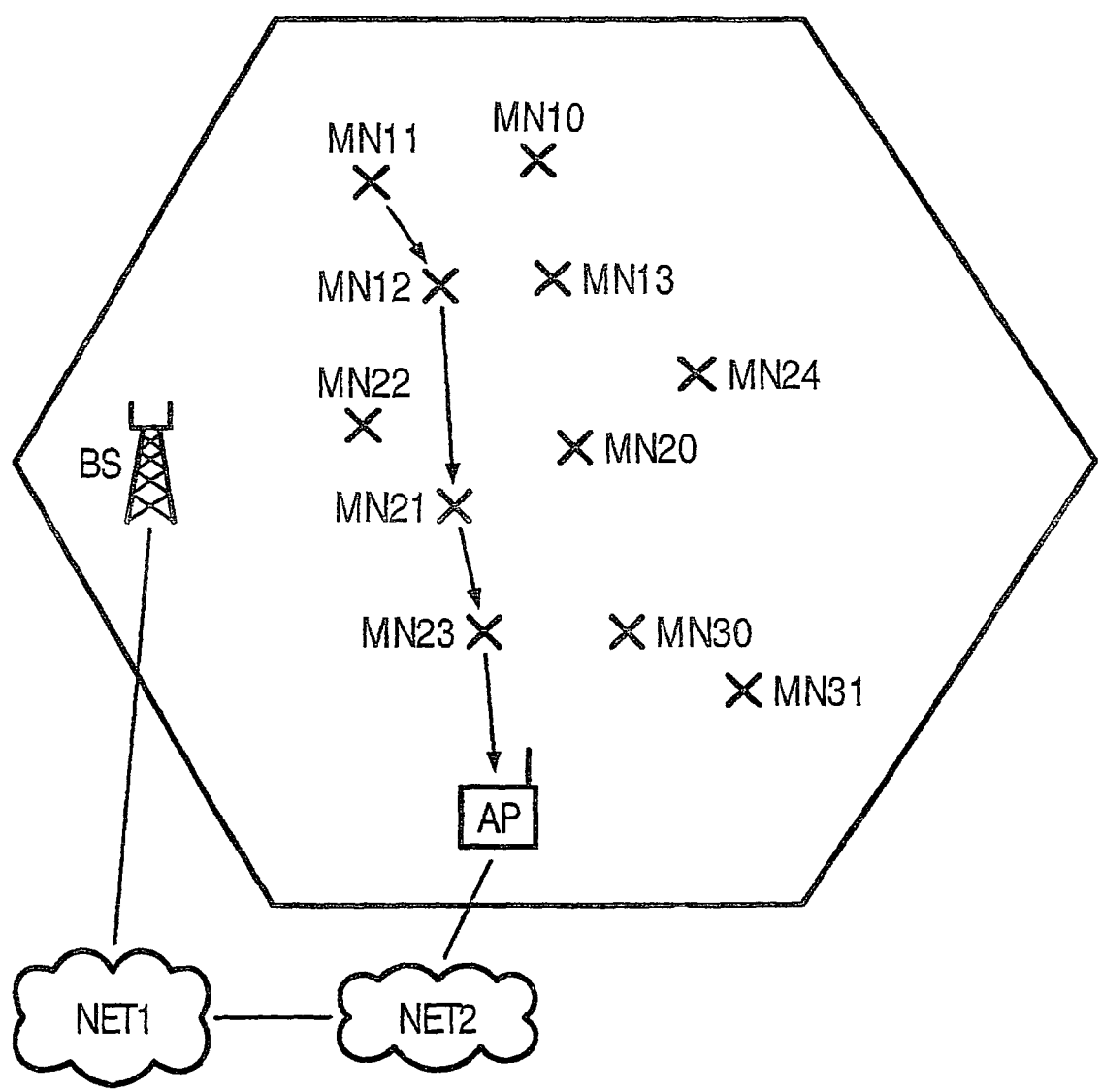
FIG. 1: a first path through a radio communications system.

Reference will now be made in detail to the preferred embodiments of the present invention, examples of which are illustrated in the accompanying drawings, wherein like reference numerals refer to like elements throughout.

FIG. 1 shows a radio communications system in the form of a WLAN, which comprises the mobile stations MN10, MN11, MN12, MN13, MN20, MN21, MN22, MN23, MN24, MN30 and MN 31 and a radio access point AP. The radio access point AP is connected to a network NET2, which makes it possible for the mobile stations of the WLAN to communicate with other communication systems and data networks. In addition, FIG. 1 shows a base station BS of a cellular mobile radio communications system with its radio cell shown by a hexagon. The base station BS is connected to a core network NET1, which on the other hand has a connection to the network NET2 of the WLAN. In the case of the cellular mobile radio communications system, it can for example involve a system in accordance with the GSM standard or the UMTS standard.

The connection of the mobile stations MN10, MN11, MN12, MN13, MN20, MN21, MN22, MN23, MN24, MN30 and MN 31 to the cellular mobile radio communications system makes possible an uninterrupted radio contact of the mobile stations, irrespective of their mobility and their position. This can then always be used as a fallback position when there is no radio coverage by a WLAN. WLANs are set up in the range of the cellular mobile radio communications systems, to make possible for example, the broadband radio access to the Internet over radio access points such as the radio access point AP for the mobile stations. Typically, radio access points have a greatly restricted transmitting power of for example 1 W in the 2 GHz range or the 5 GHz range, so that their radio coverage area extends across a maximum of several hundred meters. In addition to this direct radio coverage area of the radio access points, data is transmitted from or to the radio access points over a plurality of hops through the mobile stations.

Below it is assumed that the WLAN uses an OFDM transmission method. In this method, a frequency band is subdivided into a plurality of subbands. The subbands are then dynamically assigned to the mobile stations on the subscriber side for communication. In this case, one are more subbands can be assigned to a mobile station, with the subbands then usually being used by the mobile station for sending data to the neighboring stations. However, it is also possible, in order to send data to a neighboring mobile station, to use the subbands assigned to this mobile station.

In the example considered in FIG. 1, the mobile station MN11 intends sending data to the radio access point AP. Because this point is located outside its radio range, a path must previously have been determined between the mobile station MN11 and the radio access point AR For this purpose, it is assumed that the base station BS is conversant with the neighboring relationships between the mobile stations, which means the topology of the network.

As soon as a mobile station arrives within the radio coverage areas of the base station BS, the base station BS informs this mobile station about the central frequency of the frequency band used for communicating within the WLAN. The mobile stations in the radio cell of the base station BS transmit signaling messages at regular intervals, on the basis of which these can be detected by their neighboring mobile stations. These signaling messages can either be transmitted for all the mobile stations on a joint subband or the base station BS in each case assigns different subbands to the mobile stations for the transmission of the signaling messages. The new mobile station added to the radio cell of the base station BS monitors the subbands of the frequency band in order to detect its neighboring mobile station. It sends the result of the detection to the base station BS. In addition, the other mobile stations send the information about the neighboring mobile stations determined by them to the base station BS at regular intervals. In this way, the base station BS obtains knowledge of the current topology of the network. Subsequent to the detection of neighboring mobile stations by the newly-added mobile station, the base station BS assigns one subband or a plurality of subbands to this station for communication with the neighboring mobile stations.

In order to determine the path between the mobile station MN11 and the radio access point AP, the mobile station MN11 sends a request to the base station BS. As a result, this station then determines a suitable path between the mobile station MN11 and the radio access point AP. The method, which is used by the base station BS in order to determine the path taking the current network topology as a starting point, is not relevant to understanding the method. In the example in FIG. 1, the path determined by the base station BS comprises the mobile stations MN12, MN21 and MN23. Because the mobile stations MN12, MN21 and MN23 of the path are neighboring mobile stations in each case, information can be transmitted over the path to the radio access AP by the mobile station MN11 about the mobile stations MN12, MN21 and MN23 of the path.

After the base station BS has determined the mobile stations MN12, MN21 and MN23 of the path, suitable information is transmitted about the path to these mobile stations MN12, MN21 and MN23 so that a communication between the mobile station MN11 and the radio access point AP can take place. For this purpose, the base station BS transmits the identification information of the path in the form of a path number to the mobile station MN11, the mobile stations MN12, MN21 and MN23 as well as the identification information of the path in the form of a path number to the radio access point AP. In addition, the identification information of that mobile station is transmitted to those mobile stations, to which it is to route the data during communication between the mobile station MN11 and the radio access point AP: the identification information of the mobile station MN12 is sent to the mobile station MN11, the identification information of the mobile station MN21 is transmitted to the mobile station MN12, the identification information of the mobile station MN23 is sent to the mobile station MN21 and the identification information of the receiver mobile station is sent to the mobile station MN23, i.e. the radio access point AP. Finally, the mobile stations MN11, MN12, MN21, MN23 receive, in addition to the identification information of the next mobile station in each case, the information about the subbands assigned to this station's closest mobile station by the base station BS. In this way, the mobile station MN11 receives the information about the subbands of the mobile station MN12, the mobile stations MN12 about the subbands of the mobile stations MN21, the mobile station MN21 about the subbands of the mobile stations MN23 and the mobile station MN23 about the subbands of the radio access point AP.

In addition, it is possible for the base station BS to send the information to the mobile stations MN11, MN12, MN21, MN23 together with the previously described path information about the subbands assigned to the stations. In this way, the base station BS can inform the mobile station MN12 for example about which subbands it can use for communication. This assigning of the subbands can confirm or even correct a previously implemented assignment. A correction of a previously implemented assigning is, for example, sensible in cases when a mobile station along the path when data is transmitted from the mobile station MN11 to the radio access point AP, establishes that its radio resources are not sufficiently available for routing the data.

The routing information described can be transmitted repeatedly by the base station BS for confirmation, for example at regular intervals. However, it is also possible in this case for the path determined to be modified by the base station BS over time. This is more particularly meaningful in cases when the mobile stations of the path move onwards and thus can no longer function as relay stations or when new, mobile stations are added in the vicinity of the path so that a more suitable path exists.

On the basis of the routing information transmitted by the base station BS, data can be transmitted from the mobile station MN11 to the radio access point AP. For this purpose, the mobile stations MN11, MN12, MN21 and MN23 use the identification information of the path so that the next mobile station knows about the path over which the data is to be routed in each case. In addition, each mobile station, on the basis of the identification information transmitted to it, knows its neighboring mobile station along the path to which the data is to be forwarded. This routing can for example take place by using subbands of the neighboring mobile station, to which the data is forwarded. However, the mobile stations can also use the subbands assigned to them for forwarding the data.

Figure 2:
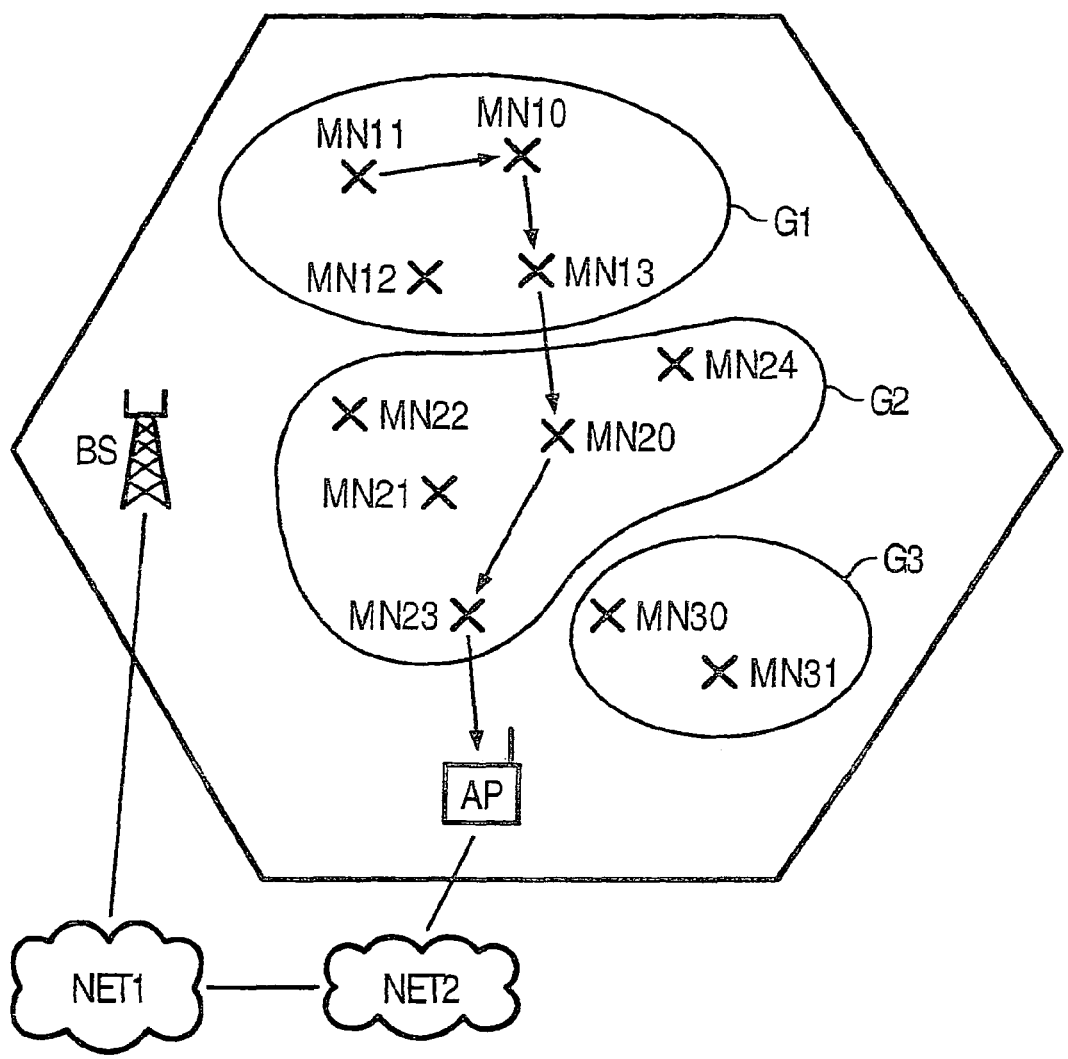
FIG. 2: a second path through a radio communications system.

FIG. 2 shows the previously considered radio communications system, with the mobile stations being divided into groups. The mobile stations MN10, MN11, MN12 and MN13 form part of the first group G1, the mobile stations MN20, MN21, MN22, MN23 and MN24 form part of the second group G2 and the mobile stations MN30 and MN31 form part of the third group G3. Each group G1, G2, G3 has a central mobile station MN10, MN20 and MN30. The central mobile stations MN10, MN20 and MN30 are adjacent to all the other mobile stations of the same group so that they can communicate with all the mobile stations of the group.

The base station BS assigns a plurality of subbands to a group for communicating, with these being assigned to the central mobile station of the respective group. Subsequently the central mobile station MN10, MN20 and MN30 of every group in its turn dynamically assigns the subbands assigned to it by the base station BS to the individual mobile stations of its group. For communication between the groups, the central mobile station of every group determines a mobile station which communicates with the central mobile station of the neighboring group. In the example in FIG. 2, the central mobile station MN10 determines the mobile station MN13 for communicating with the central mobile station MN20 of the group G2. The central mobile station MN20 determines the mobile station MN23 for communicating with the central mobile station MN30 of the third group G3 as well as for communicating with the radio access point AP.

The case in which mobile station MN11 wishes to communicate with radio access point AP is considered again below. For this purpose, the station transmits a corresponding request to the base station BS. However, the base station BS does not determine the complete path between the mobile station MN11 and the radio access point AP, but rather only the central mobile stations along the path. The base station BS, in this way, determines the mobile stations MN10 and MN20 as parts of the path between the mobile station MN11 and the radio access point AP.

The base station BS subsequently transmits the routing information to the mobile stations. The identification information of the path is transmitted to the mobile station MN11. The identification information of the path and the identification information of the next central mobile station are transmitted along the path to the central mobile station MN10, i.e. the identification information of the mobile station MN20. Because the mobile station MN20 does not have a neighboring central mobile station on the path from the mobile station MN11 to the radio access point AP, both the identification information of the path and the identification information of the receiver station, i.e. the radio access point AP are transmitted to the mobile station MN20.

The central mobile stations MN10 and MN20 subsequently transmit the routing information to those mobile stations of their group which are to route the data to the next central mobile station. The mobile station MN10 thus transmits the identification information of the path and the identification information of the mobile station MN20 as well as the subbands assigned to the mobile station MN20 to the mobile station MN13. Likewise, the mobile station MN20 transmits the identification information of the path and the identification information of the radio access point AP to the mobile station MN23.

Data about the central mobile station MN10, the forwarding mobile station MN13, the central mobile station MN20 and the forwarding mobile station MN23 can be transmitted in this way from the mobile station MN11 to the radio access point AP. This second embodiment of the method distinguishes itself from the embodiment previously mentioned in that the base station does not have full information about the subbands assigned to each mobile station of the WLAN. Instead, the central mobile of every group has full knowledge of the subbands assigned to every mobile station of its group. In this way, the base station BS transmits the information about the path determined by it to only some of the mobile stations of the path, namely the central mobile stations, which transmit the information needed for routing the information about the path to the forwarding mobile stations of their group.

For the transmission of data from the mobile station MN11 to the radio access point AP, the mobile station MN11 transmits the identification information of the path together with the data to the central mobile station MN10 of its group G1. This station routes the data to the mobile station MN13 by taking into account the identification information of the path. Through the mobile station MN13, a routing to the central mobile station MN20 takes place, which transmits the data about the mobile station MN23 to the radio access point AP. In this case, for each routing of the data, the identification information of the path is taken into account.

Both in the case of the path in FIG. 1 and in FIG. 2, the subbands have been assigned to the neighboring mobile station of the path are known to the mobile stations which forward the data. The data can result can thus be provided by a mobile station using its own assigned subbands or using the subbands assigned to the neighboring mobile station.

Also in the example in FIG. 2, the base station BS can when transmitting the routing information to the central mobile stations, make a correction or undertake a confirmation from the subbands assigned to the respective group. It is also possible for other routing information such as the neighboring mobile station of the path and/or the subbands assigned to this mobile station can be changed by the base station BS.

In addition it is possible for identification information of the neighboring mobile stations or the neighboring central mobile station in each case along the path in the direction from the radio access point AP to the mobile station MN11 to be transmitted to the mobile stations of the path in accordance with FIG. 1 or the central mobile stations in accordance with FIG. 2. In this case, the mobile station MN20 would for example transmit the identification information to the central mobile station MN10 and the central mobile station MN10 the identification information to the mobile station MN11. In addition, depending on which identification information is transmitted, the assigned subband or subbands are also communicated to each mobile station.

Figure 3:
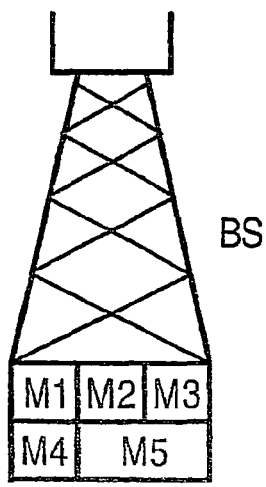
FIG. 3: a radio installation according to one potential embodiment of the invention in the form of a base station.

FIG. 3 shows a base station BS with a mechanism for carrying out the method described above. The mechanism Ml serves to store the topology of the network from mobile stations and the means M2 to assign subbands to the mobile stations. In this way, either subbands can be assigned to each individual mobile station or also only to the central mobile stations, which in their turn can assign subbands to the mobile stations of their group. The memory M3 serves to store the assignment implemented by the base station BS. With the means M4, the base station BS can at least determine the parts of a path between two mobile stations on request in this respect. It is possible for the base station BS to determine the complete path, i.e. all the mobile stations of the path or also to only determine individual mobile stations of the path such as for example the central mobile stations in FIG. 2. On the basis of the transmitter M5, the base station BS can transmit information about the specific path to the mobile stations, whereby this information comprises the path identification information of the specific path as well as the mobile station identification information of at least one other mobile station of the path or also of the second mobile station, and also can transmit the subband information about at least one subband assigned to the at least one mobile station corresponding to the mobile station identification information.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. A method for determining a path to convey information from a first radio station to a second radio station via at least one intermediate radio station, the information being conveyed such that the first radio station and each intermediate radio station transfer the information to an adjacent radio station in a direction of the path, from a transferor radio station to a transferee radio station, comprising:
dividing a frequency band into a plurality of frequency subbands for communication between the radio stations, with at least one frequency subband being assigned to each radio station, the frequency band being divided at a base station;
determining the path at the base station upon request of the first radio station, the path being determined by identifying links from the first radio station to the second radio station via at least one intermediate radio station and assigning a frequency subband to each link on the path;
transmitting first path identification information, from the base station to the first radio station, the first path identification information describing a first link, which extends from the first radio station, first path identification information specifying the intermediate radio station connected to the first radio station via the first link and information regarding the at least one subband assigned to the intermediate radio station connected to the first radio station via the first link; and
separately transmitting from the base station directly to each of the one or more intermediate radio station later path identification information, the later path identification information describing a later link from the intermediate radio station, the later path identification information specifying (a) a next adjacent radio station connected to the intermediate radio station via the later link, and (b) the frequency subband assigned to the later link,
wherein the base station transmits to each intermediate radio station:
information identifying the transferor radio station for the intermediate radio station, and
information identifying the frequency subband assigned to the transferor radio station.

2. A method according to claim 1, wherein,
the base station transmits the path identification information to the second radio station.

3. A method according to claim 2, wherein the base station also transmits to the second radio station:
information identifying the transferor radio station for the second radio station and
information identifying the frequency subband assigned to the transferor radio station.

4. A method according to claim 1, wherein,
the radio stations of the radio communications system are combined into groups,
each group has a single representative radio station, and
the base station only communicates with the representative radio stations in transmitting the path identification information, the information identifying the radio station and the information identifying the frequency subband assigned on it.

5. A method according to claim 4, wherein in identifying the transferee radio station and the frequency subband assigned to it:
the base station transmits information relating to the transferee radio station.

6. A method according to claim 5, wherein in identifying the radio station and the frequency subband assigned to it:
the base station also transmits information relating to the transferor radio station.

7. A method according to claim 6, wherein,
each representative radio station forwards the path information and/or sends information identifying the transferee radio station and/or sends information identifying the frequency subband to at least one radio station of its group.

8. A method according to claim 4, wherein,
at least one representative radio station forwards the path information and/or the information identifying the radio station and/or the information identifying the frequency subband to at least one radio station of its group.

9. A method according to claim 4, wherein each representative radio station is in direct radio contact with all other radio stations of the group.

10. The method according to claim 1, wherein the path identification information is a path number.

11. A method according to claim 1, wherein,
the base station transmits the path identification information to the second radio station.

12. A method according to claim 11, wherein the base station also transmits to the second radio station:
information identifying the transferor radio station for the second radio station and
information identifying the frequency subband assigned to the transferor radio station.

13. An apparatus comprising:
a memory to store neighboring relationships between radio stations of a radio communications system;
a processor configured to assign a frequency subband to each radio station for communication with another radio station, each frequency subband being part of a frequency band divided into a plurality of frequency subbands;
a memory to store information about how the frequency subbands have been assigned to the radio stations;
the processor configured to determine at least a portion of a path to convey information from a first radio station to a second radio station via at least one intermediate radio station, the information being conveyed such that the first radio station and each intermediate radio station transfer the information to an adjacent radio station in a direction of the path, from a transferor radio station to a transferee radio station, the path being determined upon receipt of a request, the path being determined by identifying links from the first radio station to the second radio station via at least one intermediate radio station and assigning a frequency subband to each link on the path; and
a transmitter to separately transmit:
first path identification information to the first radio station, the first path identification information describing a first link, which extends from the first radio station, first path identification information specifying the intermediate radio station connected to the first radio station via the first link and information regarding the at least one subband assigned to the intermediate radio station connected to the first radio station via the first link; and
later path identification information directly to each of the one or more intermediate radio station, the later path identification information describing a later link from the intermediate radio station, the later path identification information specifying (a) a next adjacent radio station connected to the intermediate radio station via the later link, and (b) the frequency subband assigned to the later link,
wherein the transmitter is configured to further transmit to each intermediate radio station:
  information identifying the transferor radio station for the intermediate radio station, and
  information identifying the frequency subband assigned to the transferor radio station.

* * * * *